Sept. 25, 1951 W. K. RIEBER 2,568,869

SOUND RECORD DRIVE

Filed Nov. 14, 1945 5 Sheets-Sheet 1

INVENTOR.
WILLIAM K. RIEBER,
BY
[signature]
ATTORNEY.

Sept. 25, 1951 W. K. RIEBER 2,568,869

SOUND RECORD DRIVE

Filed Nov. 14, 1945 5 Sheets-Sheet 2

INVENTOR.
WILLIAM K. RIEBER,
BY
Robert W. Fulwider
ATTORNEY.

INVENTOR.
WILLIAM K. RIEBER,
BY
Robert W. Fulwider
ATTORNEY.

Sept. 25, 1951 W. K. RIEBER 2,568,869

SOUND RECORD DRIVE

Filed Nov. 14, 1945 5 Sheets-Sheet 4

INVENTOR.
WILLIAM K. RIEBER,

BY

ATTORNEY.

INVENTOR.
WILLIAM K. RIEBER,
BY
[signature]
ATTORNEY.

Patented Sept. 25, 1951 2,568,869

UNITED STATES PATENT OFFICE 2,568,869

SOUND RECORD DRIVE

William K. Rieber, Los Angeles, Calif.

Application November 14, 1945, Serial No. 628,449

9 Claims. (Cl. 74—206)

Figure 1:
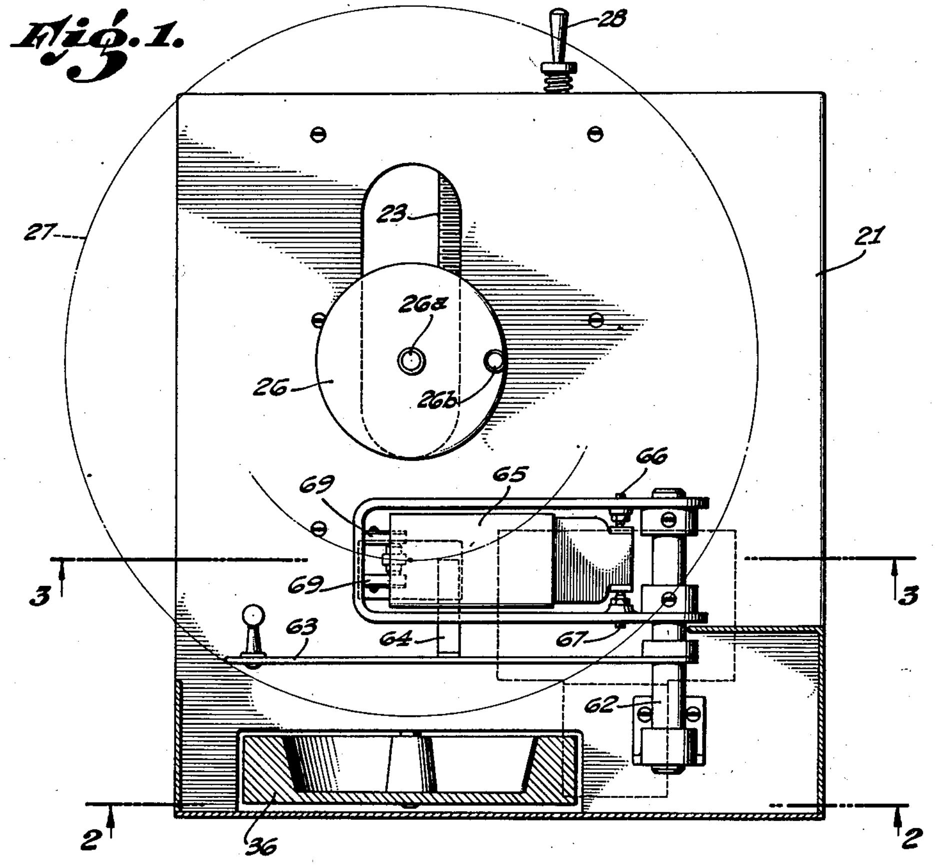

My invention relates generally to phonographic recording and transcribing apparatus wherein sound is recorded by engraving or embossing with a vibrating stylus, a spiral groove in a rotating disc-shaped record blank, and transcribed therefrom by tracing the sound groove with a stylus or needle member carried by a tone head.

One object of the present invention is to provide record driving means suitable for use in recording and transcribing after the manner set forth in the above referenced application.

Another object of my invention is to provide a record driving means for a sound recording and transcribing device which employs a relatively fixed engraving or embossing stylus operating on a record disc supported by a relatively movable record supporting member adapted to move the record disc past the stylus in a combined rotational and rectilinear motion, whereby to produce a spiral sound groove and in which the desired rotational motion of the record is obtained through direct engagement of a constant-speed rotational drive member with the record, the drive member being located in such relation to the stylus as to effect constant linear speed of the record surface past the stylus.

It is additionally an object of my invention to provide a record drive system suitable for devices of the class described which is particularly suited to drive thin and relatively flexible records and which maintains a proper operational relationship between the record and a recording or transcribing stylus regardless of warpage of the record material.

It is a still further object of my invention to provide a record drive of the class described wherein the drive torque is imparted through a transmission system which includes a resilient member whereby to filter out undesirable vibratory variations in drive speed, thus providing a smooth uniform record motion, and minimizing distortion of the recorded sound.

The preferred form of my invention illustrated herein comprises a chassis carrying a rotatably mounted lead-screw which is continuously engaged by a lead nut adapted to be moved longitudinally with respect to said lead screw upon relatively rotation thereof, a record-supporting member, hereinafter referred to broadly as a carriage which is constrained to rectilinear movement with said lead nut, said carriage including a record receiving spindle operatively associated with said lead nut adapted to effect rotation of said lead nut, means for roating said record, which include drive means operating against one surface of the record and a record hold-down means operating against the opposite record surface to secure frictional engagement of the record and drive means, a sound translating head which includes stylus means engageable with said record, and auxiliary means for selectively rotating said lead-screw to effect a controlled translation of said record with respect to said sound head.

The normal operation of my device in the production of a sound track on the record, or the reproduction of sound therefrom, involves the rotation of the disc-shaped record, which causes rotation of the record spindle which in turn effects a rotation of the lead nut upon the lead screw, thus producing combined rotational and rectilinear movement of the record past the sound head. When desired, the operator may rotate the lead screw to effect a controlled rectilinear movement of the record with respect to said sound head, whereby any desired portion of the record may be quickly brought into operative engagement with the stylus.

Other objects and advantages of the invention will become apparent from the following description of a preferred embodiment thereof, and from the accompanying drawings, in which:

Figure 1 is a partially sectioned plan view of the device showing a record in a position intermediate between the beginning and end of a recording.

Figure 2:
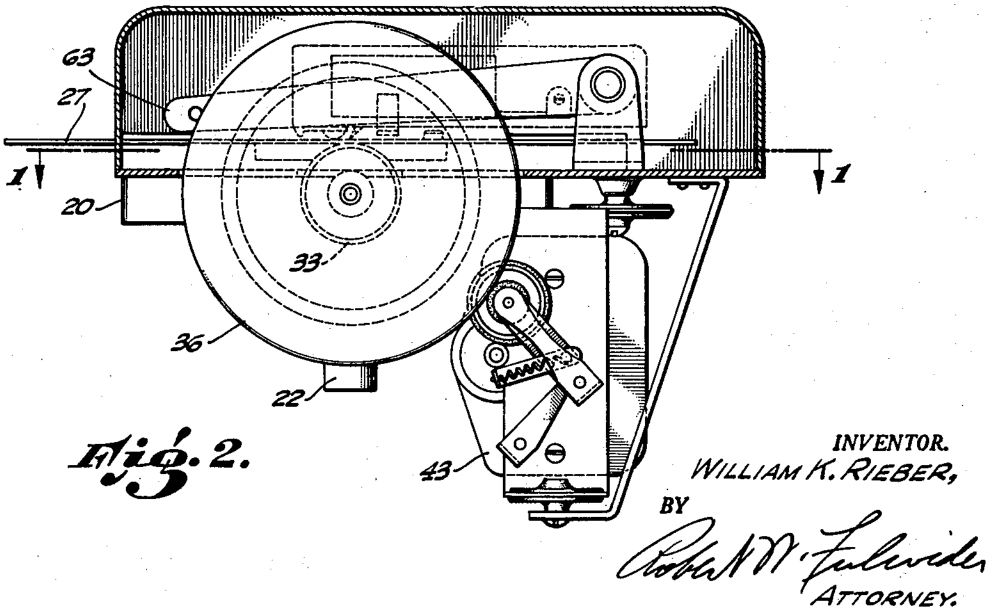
Figure 3:
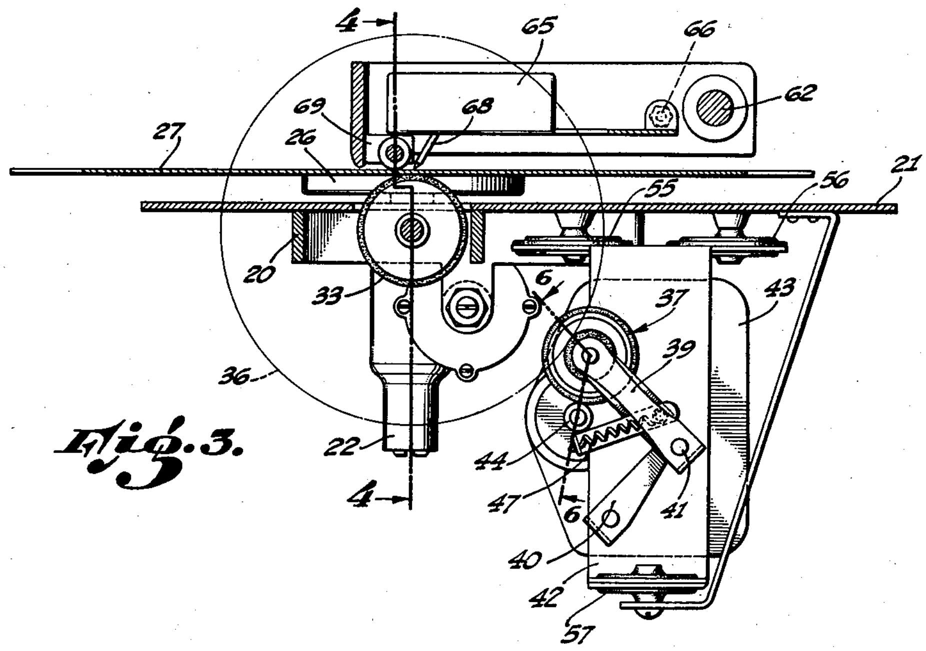
Figure 4:
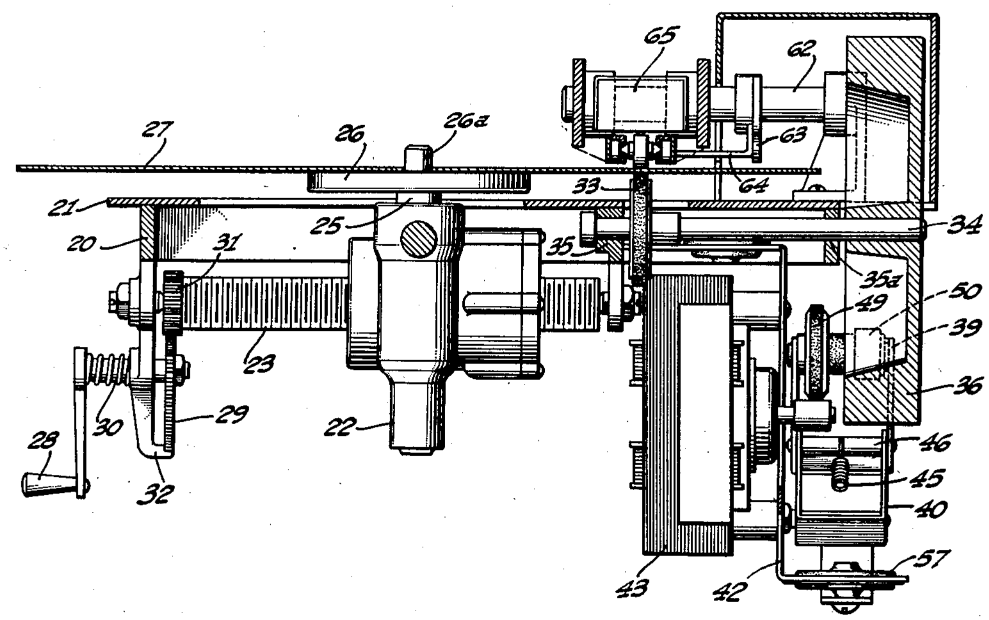
Figures 5, 6:
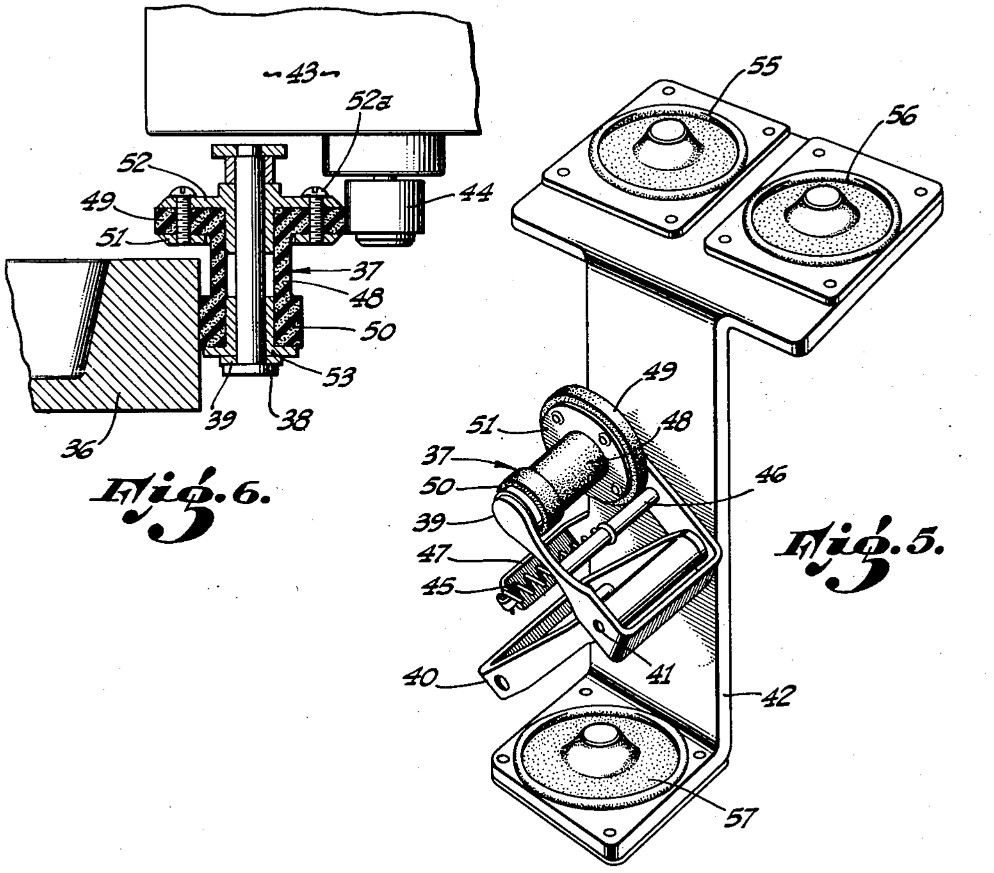
Figure 7:
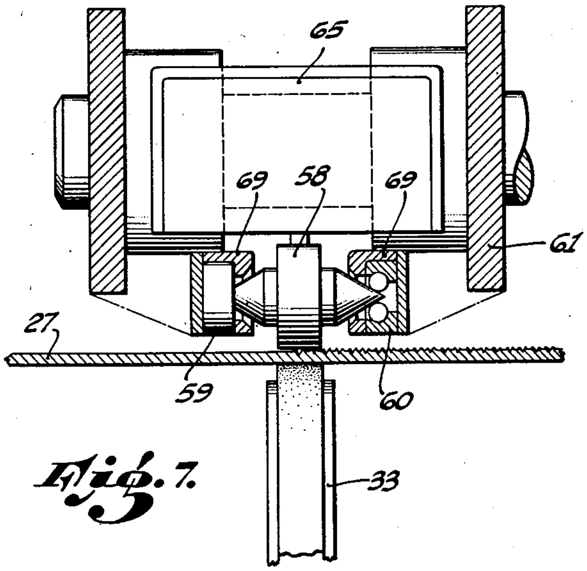
Figure 8:
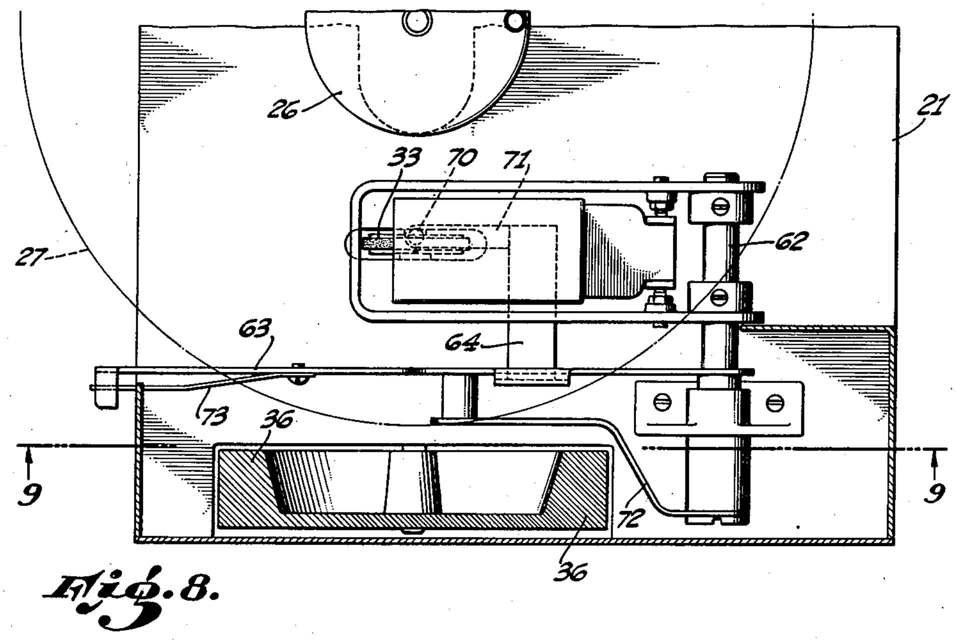
Figure 9:
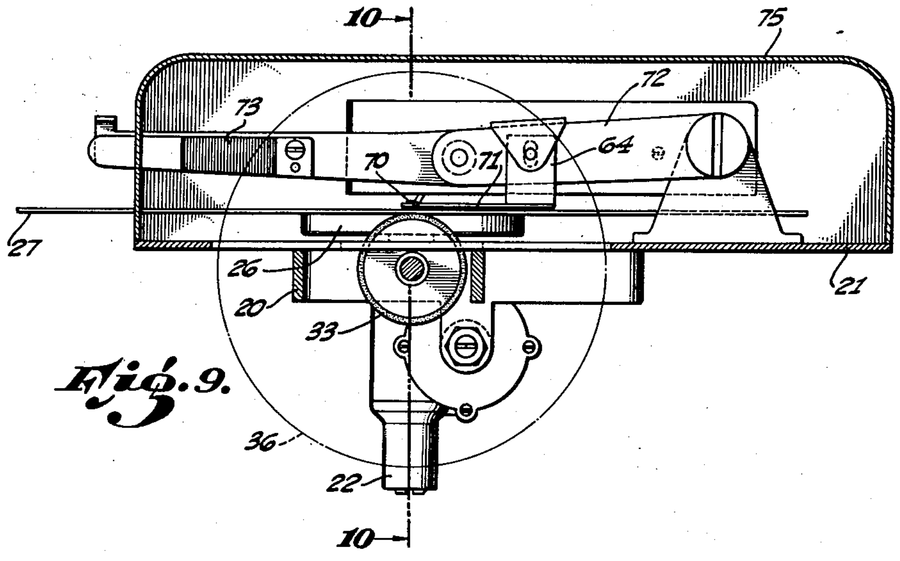
Figure 10:
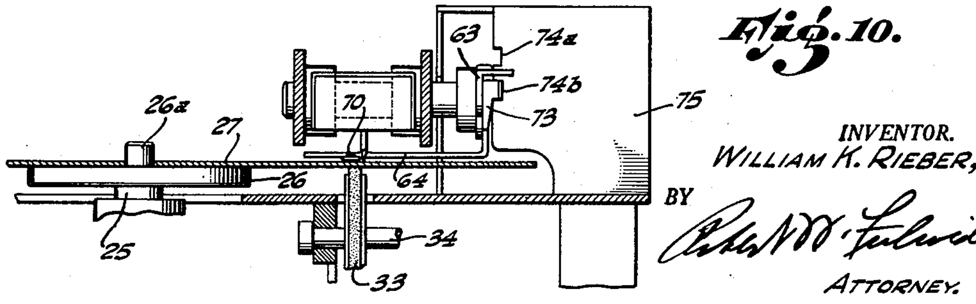
Figure 11:
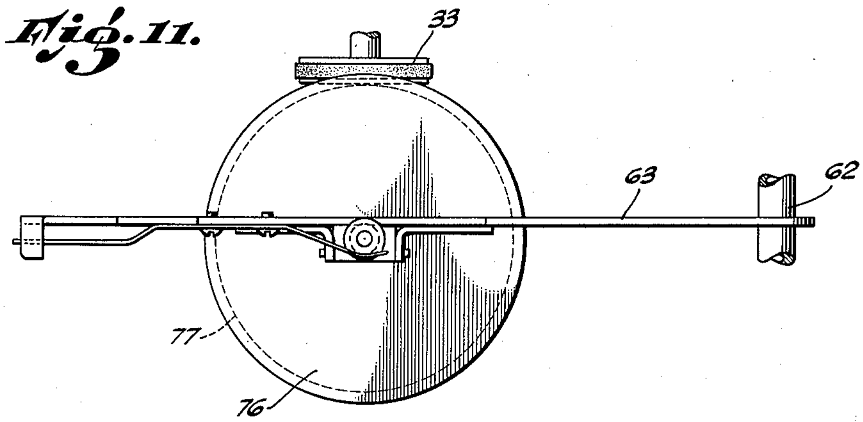
Figure 12:
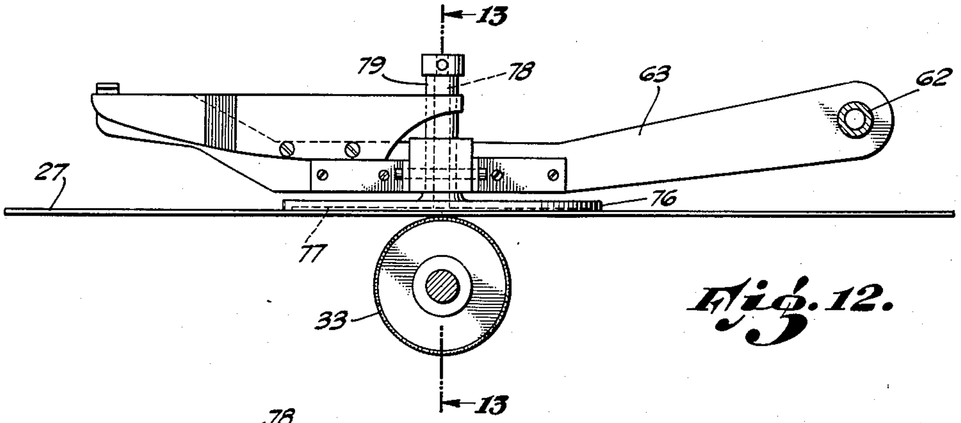
Figure 13:
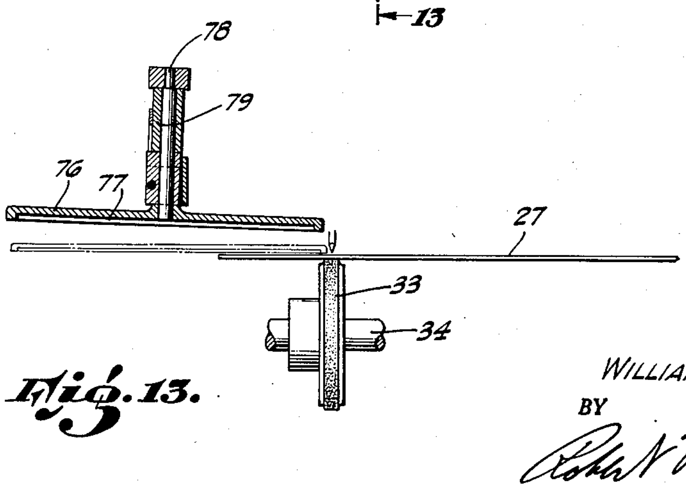

Figure 2 is a transverse sectional view thereof taken on the line 2—2 in Figure 1, Figure 3 is another transverse sectional view taken on the line 3—3 in Figure 1, Figure 4 is a longitudinal sectional view taken on the line 4—4 in Figure 3, Figure 5 is a perspective view of a vibration isolating assembly and a friction coupling member mounted thereon, Figure 6 is a sectional plan view of the friction coupling member shown in Figure 5, taken on the line 6—6 in Figure 3, Figure 7 is an enlarged detail of a portion of Figure 4 showing portions of the sound head mounting and a record hold-down roller mounted therein, Figure 8 is a partially sectioned plan view of a modified form of the record-driving portions of the device employing a flat, jewel-type record hold-down, Figure 9 is a transverse sectional view of the device shown in Figure 8 taken on the line 9—9 in Figure 8, Figure 10 is a sectional longitudinal view of the device shown in Figure 8 taken on the line 10—10 in Figure 9, Figure 11 is a plan view of record-drive, and hold-down portions of the device showing a second modified form of these portions, Figure 12 is a transverse elevational view of the portions shown in Figure 11 and with a record in place, and Figure 13 is a longitudinal view of the portions shown in Figure 11, taken on the line 13—13 in Figure 12.

Referring to the drawings, and particularly Figs. 1, 2, 3, and 4 thereof, the numeral 20 indicates a chassis having a table 21 and a record supporting carriage 22 mounted on a horizontally disposed lead screw 23. The lead screw 23 is pivotally mounted at its ends in the chassis for free rotational movement. The carriage 22 carries a vertical spindle 25 provided with a record supporting hub 26 adapted to receive a record 27. The hub 26 is preferably provided with a central guide pin 26*a* adapted to pass through a centrally located opening in the record 27, and a radially spaced drive pin 26*b* adapted to enter a co-actingly positioned drive opening in the record 27.

The spindle 25 is rotatably mounted in the carriage 22 wherein a lead nut and suitable irreversible gearing is provided for continuous driving engagement with the lead screw 23 whereby rotation of spindle 25 effects rectilinear motion of the carriage 22 along the lead screw 23. Suitable auxiliary carriage positioning means such as a crank 28 and a gear 29 is mounted as by a shaft 30 to the chassis 20 and engaged as through a pinion 31 with the lead screw 23 to effect rotation thereof and consequent rectilinear motion of the carriage 22. In the present embodiment a selectively disengageable detent 32 is provided to prevent rotation of the lead screw 23 during the recording or transcribing process.

As has been hereinbefore stated, rotation of the record 27 results in rectilinear motion of the carriage thereby producing the combination of motions required to produce the spiral record groove for the process of recording. Rectilinear motion without concurrent rotation of the record 27 such as is necessary for returning the carriage 22 after a recording or for setting of the record preparatory to transcribing a part thereof, is effected by rotating the lead screw in the desired direction by means of crank 28.

The record spindle 25 extends through a slot in the table 21, and the record supporting hub 26 is located above the table, as shown more particularly in Figs. 1, 3, and 4. The record 27 carried by the hub 26 is adapted to be rotated through the agency of a drive wheel 33 positioned to engage the lower surface of the record at the plane of the upper surface of the hub 26, said drive wheel 33 being mounted on a horizontal shaft 34 provided with bearings 35 and 35*a* supported in the chassis. At the outer end of the shaft 34 I provide a flywheel 36 adapted to be engaged by a friction-drive coupling 37 mounted on a bearing shaft 38 which is carried by an upper yoke 39 and a lower yoke 40 hinged thereto by a pin 41. The lower yoke 40 is pivotally mounted to a vibration-isolating frame 42 which also carries a drive motor 43 having a drive drum 44 on the shaft thereof and in driving engagement with the coupling 37. As can be best seen in Figure 3, the articulated yoke mounting of the coupling 37 provides a floating drive and permits limited translatory motion of the coupling 37 in any direction in the plane of the drawing. The coupling is urged leftwardly and downwardly against the flywheel 36 and drive drum 44 by a tension spring 45 anchored to a pin 46 in the upper yoke at one end and to a projecting lug portion 47 of the frame 42 at the other.

The friction-drive coupling 37 in the present embodiment comprises a resilient torque sleeve 48 of rubber or comparable material (the term "resilient" being used herein to describe a material of "yielding flexibility" rather than the property of "resiliency" in its usual mechanical meaning), formed with a relatively large flange 49 on one end and a smaller flange 50 on its other end. The large flange 48 is preferably held between a washer 51 and the shoulder of a shouldered bearing 52 by screws 52*a* as seen best in Figure 6. A similar shouldered bearing 53 is secured in the other end of the torque sleeve 48, the bearings 52 and 53 rotatably supporting the coupling 37 on the shaft 38. The larger flange 49 frictionally engages the driving drum 44 and the smaller flange 50 engages the flywheel 36 to thereby drive the latter at a speed less than that of the shaft of motor 43.

The resilient drive coupling 37 serves to damp out unwanted vibrations and speed variations originating in the motor, the translatory vibrations being absorbed by deformation of the flanges 49 and 50 at their points of contact with the drive drum 44 and the flywheel 36, and by the previously mentioned floating action of the coupling; and the speed variations being equalized by twisting deformation of the torque sleeve 48.

In the method of vibration damping just described it is desirable to include an inertia element which is provided in the present device by the relatively heavy flywheel 36 which resists accelerative forces such as vibration and speed changes, thus causing them to be absorbed in the coupling 37. A desireable feature achieved by this drive system is the uniform and constant moment of inertia introduced by the flywheel due to its constant speed of rotation. Constant-linear-speed recorders and transcribers previously used have made use of a record-bearing turn table as an inertia member and since to achieve constant linear speed, the speed of the turntable must vary as the record progresses, the moment-of-inertia factor varied greatly being proportional to the square of the turntable speed. It will be noted further that vibrations are isolated and prevented from reaching the sound head or record by mounting all vibration-generating members such as the motor 43, the coupling 37 and its mounting yokes 39 and 40 on the vibration isolating frame 42 which is in turn secured to the table 21 and a bracket 54 by shock mounts 55, 56, and 57 of rubber or similar vibration-absorbent material.

The drive system just described produces smooth, steady, and quiet rotation of the flywheel 36 and hence the drive wheel 33 mounted on the same shaft therewith. In order to maintain a sufficient and uniform degree of frictional engagement between the drive-wheel 33 and the record 27 hold-down means operating on the upper surface of the record may be provided by any one of several means. I prefer to employ a roller 58 pivotally mounted in ball bearings 59 and 60 held in the forward end of a frame member 61 which is hinged at its rearward end on a support shaft 62 for downwardly swinging motion above the record. It will be seen from an examination of Figs. 1, 2, 3, 4, and particularly 7 wherein the hold-down roller 58 and its mounting details are shown, that the position of the frame 61 and the roller therein is such that the axis of the roller is parallel to the drive wheel shaft 34 and the point of engagement of the roller with the record 27 is generally above and slightly forward of the point of tangency of the drive wheel 33 and the plane of the record. The weight of the frame 61 provides the downward pressure necessary to engage the drive wheel 33 and record 27, the use of weight to produce the engaging force being preferred since the engagement pressure is therefore uniform regardless of rcord thickness and is not subject to change by maladjustment or to fatigue as is a spring.

An operating lever 63 with an L-shaped bracket 64 fixed thereto and projecting to the left and under frame 61 as seen best in Fig. 4, serves as an operating handle being pivoted on the support shaft 62 at its rearward end for vertical swinging motion above the record. When the front end of the lever 63 is lifted manually, the bracket 64 engages the under side of frame 61, lifting it and the roller 58 from the record 27 thereby removing the frictional engagement pressure and also permitting the removal and replacement of records.

The frame 61, in addition to carrying the record hold-down roller 58, carries a sound head 65 pivotally mounted therein by means of adjustable pivots 66 and 67 as best seen in Figure 1. The sound head 65 may carry a single dual-purpose stylus 68 for recording or transcribing, or may be provided with separate styli as desired. In either case the operative stylus 68 is positioned immediately above the point of tangency of the drive wheel 33 and the record 27 (the relationships being particularly shown in Figure 3) and in position to engage the record. When the frame 61 is lifted as hereinbefore described, and while it remains in a lifted position, ball-bearing-carrying projections 69 in the frame engage the sound head and lift it and the stylus 68 from the record. When the frame 61 is lowered by means of the operating lever 63, the sound head and its stylus 68 are lowered, the stylus engaging the record 27 and, in the recording process, being forced slightly into the record by suitable means such as a weight on the sound head 65. Here, as with the hold-down roller 58, the pivotal mounting of the sound head 65 permits the stylus 68 to follow irregularities in the record and accommodates the device to various thicknesses of records and various lengths of styli.

An alternate form of hold-down which may be employed on the device is illustrated in Figure 8, 9, and 10, and makes use of a flat, smooth, non-rotating jewel button 70 of agate, sapphire, or similar hard material. The button 70 is highly polished on its under surface to prevent scratching of the record 27, and is mounted by cementing or other suitable means to the front end of a forwardly projecting flat leaf spring 71. The spring 71 is mounted to the L-shaped bracket 64 which projects to the left from the operating lever 63. When the lever 63 is in its lowered position, as seen best in Figure 10, the jewel 70 is pressed against the upper surface of the record 27, the urging of the spring 71 forcing the record 27 into frictional engagement with the drive wheel 33. In the present embodiment the lever 63 is reinforced by having an additional arm 72 fastened to it extending rearwardly, and pivoted on the support shaft 62. The forward end of the lever 63 carries a flat detent spring 73 mounted to the side thereof and adapted to engage one of two slots 74*a* and 74*b* in a housing 75 for the purpose of retaining it either in its upper disengaged position or in its lower operating position, the detent spring 73 being released from the slots 74*a* and 74*b* by digital pressure to raise or lower the lever 63.

A third form of record hold-down is illustrated in Figures 11, 12, and 13. Here the downward record-engaging pressure is exerted by a flat disc 76 which is disposed above the record 27 and at a slight angle to the plane thereof in such position that pressure contact is made with the record only at a point near the edge of the disc 76, the area of contact being further reduced by relieving the under surface of the disc in its central portion as shown by dotted lines in Figures 11 and 12 and indicated by the numeral 77. The disc 76 has an upwardly projecting axle 78 fixed to its center of rotation and mounted for rotary motion in a journal bearing 79, which is in turn pivotally mounted to the operating lever 63 for lateral tipping motion whereby to effect the angular relationship between the disc 76 and the record 27 above mentioned. The journal bearing 79 and hence the disc 76 carried thereby are urged into a tipped position, limited by the lever 63, by a rearwardly projecting portion of the detent spring 73 which presses against a side of the journal bearing 79. Thus it will be seen that the operation of this third form of hold-down is similar to the previous forms, i. e., lifting of the lever 63 disengages the record 27 from drive wheel 33 and permits changing of records; lowering of the lever brings the disc 76 into rolling pressure contact with the record, the disc rotating counter-clockwise as viewed in Figure 11.

It is desirable in transcription devices of the class described, particularly when used for stenography, that the equipment be adapted to stop and start at frequent intervals during the transcription of records therewith and that such stops and starts be accomplished with a minimum deceleration and acceleration period thus to avoid loss of intelligible speech. This object is best attained by reducing the moment of inertia to a minimum value required for smooth operation. It will be seen that the apparatus described herein meets the just-stated requirement by obviating the necessity of a record-bearing turntable which in previous devices of this nature has introduced a factor of excessive and non-uniform moment of inertia. The moment of inertia of the drive system in the present device can be further reduced by virtue of the novel resilient coupling used in the transmission.

While the particular apparatus herein shown and described in detail is fully capable of attaining the objects and providing the advantages hereinbefore stated, it is to be understood that it is merely illustrative of presently preferred embodiments of my invention, and that I do not mean to limit myself to the details of construction or design herein shown, other than as defined in the appended claims.

I claim:

1. In phonographic apparatus of the class described and including a friction-drive wheel directly engaged with a sound record, a power source for said drive wheel comprising in combination: a motor; a friction drive drum on the shaft of said motor and rotating therewith; a flywheel co-axially connected to said drive wheel for rotation therewith; a vibration absorbing transmission member mounted for rotation on a non-rotating shaft, constructed of resiliently flexible material, and formed as a torque sleeve member having friction driving flanges on each end thereof, one adapted to engage said drive drum, and the other adapted to engage said flywheel whereby to transmit rotary power from said motor to said friction drive wheel and to eliminate vibration and abrupt speed variations by absorption thereof in said transmission member.

2. In phonographic apparatus of the class described and including a friction-drive wheel directly engaged with a sound record, a power source for said drive wheel comprising in combination: a motor; a friction drive drum on the shaft of said motor and rotating therewith; a flywheel co-axially connected to said drive wheel for rotation therewith; and a rotating, resiliently flexible coupling member having friction drive flanges thereon; articulate mounting means for said coupling member permitting vibration-motivated, translatory, floating movement of said coupling member in a plane perpendicular to the axis of rotation thereof; and spring means urging said flanges into frictional driving engagement with said drive drum and said flywheel whereby to transmit rotary power from said motor to said friction drive wheel and to eliminate vibration and abrupt speed variations by absorption thereof in said coupling member and said articulate mounting means.

3. In phonographic apparatus of the class described and including a friction-drive wheel directly engaged with a sound record, a power source for said drive wheel comprising in combination: a flywheel co-axially connected to said drive wheel for rotation therewith; a vibration isolating frame suspended in said apparatus by resiliently flexible shock-mounts; a motor mounted on said frame; a drive drum mounted on the shaft of said motor for rotation therewith; articulate mounting means supported by said frame; a resiliently flexible rotary coupling having friction drive flanges thereon mounted for rotation in said articulate mounting means; spring means anchored to said frame and urging said flanges into frictional driving engagement with said drive drum and said flywheel whereby to transmit rotary power from said motor to said friction drive wheel and to eliminate vibration and abrupt speed variations by absorption thereof in said coupling, articulate mounting, and shock mounts.

4. In a friction drive assembly of the class described, a vibration absorbing member comprising: a sleeve portion of flexible resilient material; and a pair of cylindrical friction drive rollers formed on the ends of said sleeve portion, said drive rollers being coaxial with said sleeve portion whereby said member is adapted to transmit rotary power by engaging one of said rollers with a rotating drive member and the other of said rollers with a rotatable driven member.

5. In a friction drive assembly of the class described, a vibration absorbing member comprising: a sleeve portion of flexible resilient material; a pair of bearings secured in spaced relation within said sleeve portion whereby to permit the same to rotate on a fixed shaft; and a pair of cylindrical friction drive rollers formed on the ends of said sleeve portion, said drive rollers being coaxial with said sleeve portion whereby said member is adapted to transmit rotary power by engaging one of said rollers with a rotating drive member and the other of said rollers with a rotatable driven member.

6. In a friction drive assembly of the class described, a vibration absorbing member comprising: a sleeve portion of flexible resilient material; a pair of cylindrical friction drive rollers formed on the ends of said sleeve portion, said drive rollers being coaxial with said sleeve portion whereby said member is adapted to transmit rotary power by engaging one of said rollers with a rotating drive member and the other of said rollers with a rotatable driven member; and flange means secured to the sides of one of said friction rollers whereby to support the same when in operative position.

7. In a friction drive assembly of the class described, a vibration absorbing member comprising: a sleeve portion of flexible resilient material; and a pair of cylindrical friction drive rollers formed on the ends of said sleeve portion, said drive rollers being coaxial with said sleeve portion whereby said member is adapted to transmit rotary power by engaging one of said rollers with a rotating drive member and the other of said rollers with a rotatable driven member, and said drive rollers being of different diameters whereby to effect a change in speed of rotation between said drive and driven members.

8. In phonographic apparatus of the class described and including a friction-drive wheel and a sound record disc directly engaged therewith, a power source for said drive wheel comprising in combination: a motor having a rotating friction drive member; a flywheel coaxially connected to said drive wheel for rotation therewith; and a rotating, resiliently flexible coupling member frictionally engaged for rotary power transmission with said drive member and with said flywheel whereby to eliminate mechanical vibration and abrupt speed variations originating in said motor by absorption thereof in said coupling means.

9. In phonographic apparatus of the class described and including a friction-drive wheel and a sound record disc directly engaged therewith, a power source for said drive wheel comprising in combination: a flywheel coaxially connected to said drive wheel for rotation therewith; a vibration isolating frame suspended in said apparatus by resiliently flexible shock-mounts; a motor mounted on said frame, said motor having a rotating friction drive member; articulate mounting means supported by said frame; a resiliently flexible rotary coupling having friction drive flanges mounted for rotation in said articulate mounting means; spring means anchored to said frame and urging said flanges into frictional driving engagement with said drive drum and said flywheel whereby to transmit rotary power from said motor to said friction drive wheel and to eliminate vibration and abrupt speed variations by absorption thereof in said coupling, articulate mounting, and shock mounts.

WILLIAM K. RIEBER.

REFERENCES CITED

The following references are of record in the file of this patent:

UNITED STATES PATENTS

| Number | Name | Date |
|---|---|---|
| 1,508,827 | Valiquet | Sept. 16, 1924 |
| 2,029,730 | Mellina | Feb. 4, 1936 |
| 2,261,889 | Schneider | Nov. 4, 1941 |
| 2,296,871 | Proctor | Sept. 29, 1942 |
| 2,318,627 | Proctor | May 11, 1943 |
| 2,318,628 | Proctor | May 11, 1943 |
| 2,340,806 | Green | Feb. 1, 1944 |
| 2,345,148 | Proctor | Mar. 28, 1944 |